July 17, 1962 E. RIBBACK 3,044,326
APPARATUS FOR COLD-REDUCING ELONGATED METALLIC SHOCK
Filed Sept. 30, 1960
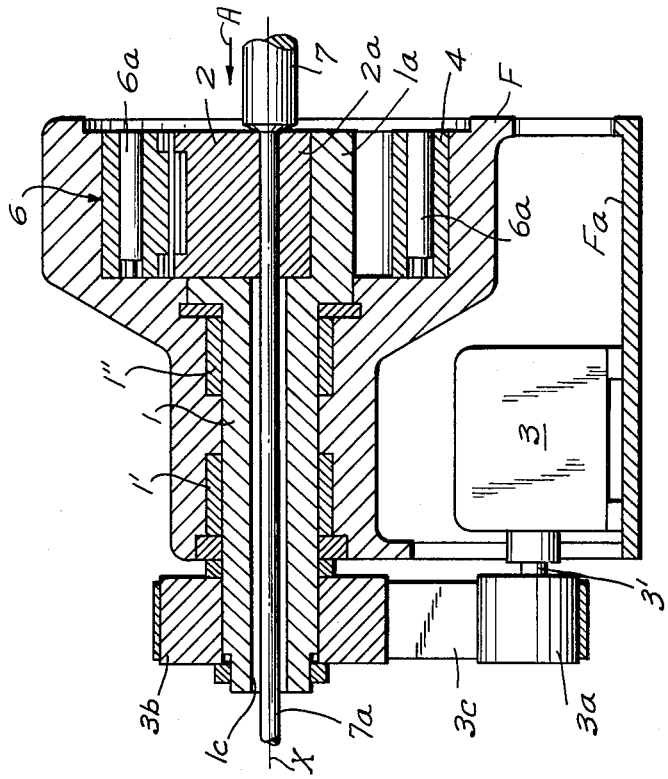
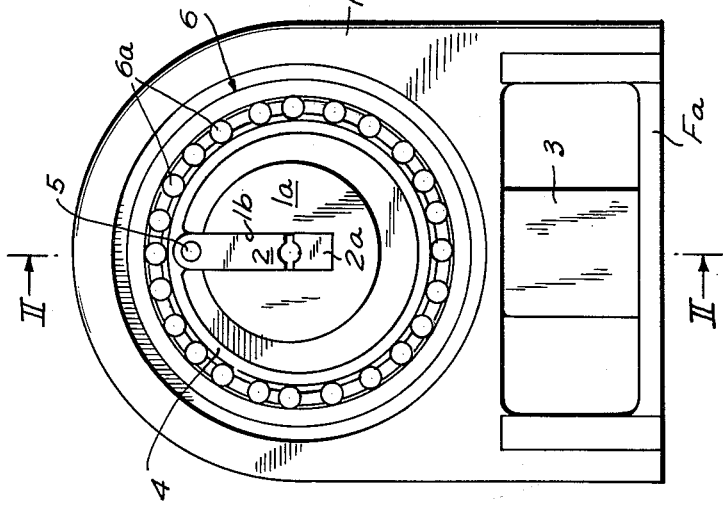
INVENTOR:
ERICH RIBBACK
BY
Michael S. Striker
his ATTORNEY 3,044,326
Patented July 17, 1962

1

3,044,326
APPARATUS FOR COLD-REDUCING ELONGATED
METALLIC STOCK
Erich Ribback, Kellereistrasse 1, Grevenmacher,
Luxembourg
Filed Sept. 30, 1960, Ser. No. 59,605
Claims priority, application Luxembourg Oct. 16, 1959
9 Claims. (Cl. 78—21)

The present invention relates to cold-reducing or cold-forming apparatus of the type wherein one or more rapidly moving dies or hammers act upon a metallic workpiece to thereby reduce its transverse dimensions. Such cold-reducing apparatus are used for the shaping of workpieces made of steel and other non-precious metals.

In presently known apparatus of this general character, the dies are reciprocable in radial slots formed in a rotary die holder which is provided with a coaxial passage for the workpiece. The die holder is surrounded by a cage for a series of rolls which travel along the inner face of a ring mounted in the apparatus frame. When the die holder rotates, the centrifugal force causes the dies to move radially outwardly into abutment with the rolls which, in turn, causes the dies to perform their working strokes radially inwardly toward the workpiece. A serious disadvantage of such known apparatus is that their moving parts, particularly the dies, are subjected to excessive wear and also that their operation is too noisy.

An important object of the present invention is to provide a cold-reducing apparatus wherein the moving parts are subjected to lesser wear, whose operation produces less noise, which consists of a small number of component parts, and which may embody a large number of dies.

With the above objects in view, the invention resides in the provision of an apparatus for cold-reducing tubular or solid elongated metallic stock which comprises essentially a frame, a rotary die holder mounted in the frame and formed with an opening or passage for the workpiece as well as with one or more radial slots for one or more radially reciprocable dies, and an annular member which is mounted in the frame and surrounds at least a portion of the die holder to serve as a support for the dies. The annular member is eccentric with respect to the die holder and is connected thereto so that the die holder and the annular member rotate in unison whereby the dies are caused to reciprocate toward and away from the workpiece. It is preferred to provide a bearing comprising a plurality of antifriction rolling elements disposed about the annular member so as to reduce the wear upon this member and also to reduce the noise when the apparatus is in actual use. Only the working faces of the dies, i.e. those faces which come into actual contact with a workpiece, are subjected to wear and tear because the rear or outer ends of the dies need not abut against a stationary part but are connected to the revolvable annular member.

The means for driving the die holder may be coupled directly to the die holder or the aforementioned annular member; in the latter instance, the die holder is mounted eccentrically with respect to the annular member. The driving connection between the die holder and the annular member is preferably established by the radially reciprocable die or dies.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawing, in which:

FIG. 1 is a schematic end elevational view of the improved apparatus; and

FIG. 2 is a longitudinal central section taken substantially along the line II—II of FIG. 1, as seen in the direction of arrows.

Referring now in greater detail to the drawing, there is shown a cold-reducing apparatus which comprises a frame F rotatably mounting a horizontal die holder 1 in suitable bearings shown at 1' and 1". One end portion of the die holder 1 constitutes a larger-diameter head or boss 1a which is formed with a radially extending open slot 1b for a suitable die 2. This die cooperates with an anvil 2a which is mounted in the die holder 1 at the diametrically opposed side of the coaxial opening or passage 1c in the die holder through which the metallic workpiece 7 is caused to pass in the direction indicated by the arrow A. As shown in FIG. 2, the die 2 and the anvil 2a cooperate to reduce the diameter of the workpiece 7 so that the latter emerges from the other end of the die holder 1 in the form of a comparatively thin rod 7a.

The boss 1a is surrounded by and spaced from an annular die supporting member 4 whose axis does not coincide with the axis X of the die holder 1, i.e. the member 4 and the die holder 1 are eccentric with respect to each other. This annular member 4 is connected with the outer end portion of the radially extending die 2 by means of a pin 5 or the like so that, when the parts 1, 4 rotate, the die 2 performs reciprocatory movements in a direction toward and away from the anvil 2a to thereby cold forge the workpiece 7.

The annular member 4 is rotatably received in an antifriction bearing 6 whose outer race is mounted in the frame F and whose rolling elements 6a are in contact with the periphery of the annular member. Such mounting of the annular member 4 reduces the friction and also suppresses the noise when the apparatus is in actual use.

The means for rotating the die holder 1 and the annular member 4 comprises an electric motor 3 which is mounted on the base plate Fa of the apparatus frame F, a driver pulley 3a which is secured to the motor shaft 3', a driven pulley 3b which is rigidly fixed to the rear end of the die holder 1, and an endless belt 3c which is mounted on the pulleys 3a, 3b. The driving connection between the die holder 1 and the annular member 4 is established by the die 2.

The operation of the improved apparatus is as follows:

A workpiece 7 is advanced through the passage 1c in the direction indicated by the arrow A while the motor 3 drives the die holder 1 and the annular member 4 at a comparatively high rate of speed. Since the annular member 4 and its bearing 6 are eccentric with respect to the axis X and are spaced from the boss 1a, the die 2 performs a working stroke and a return stroke during each revolution of the die holder. The workpiece 7 is thereby shaped between the inner end face of the die 2 and the inner end face of the anvil 2a so that it emerges from the die holder 1 in the form of a comparatively thin rod or bar 7a. The stresses arising during the working stroke of the die 2 are transmitted to the annular member 4 and are uniformly distributed to a large number of rolling elements 6a which reduces the wear upon the moving parts of the cold-reducing apparatus.

It will be readily understood that, though FIGS. 1 and 2 show only one die 2 for the sake of clarity, the improved apparatus may embody two or more radially arranged dies in the head 1a or, alternately, the dies may be mounted in two or more radially arranged groups so that a greater length of the workpiece is subjected to the reducing action when the die holder rotates. Furthermore, it is equally possible to connect the drive means 3 with the annular member 4 and to drive the die holder 1 only indirectly, i.e. through the annular member 4 and the die or dies 2. In such instances, the die holder 1 must be mounted eccentrically with respect to the annular member 4 so that the die or dies will be compelled to perform working strokes when caused to revolve about the workpiece. The above modifications are so self-evident that they hardly require any additional explanation or separate illustration.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for cold-reducing elongated stock, said apparatus comprising, in combination, a frame; a die holder rotatably received in said frame, said die holder formed with a passage for a workpiece and having at least one substantially radial slot communicating with said passage; a die reciprocably received in said slot; an annular member rotatably mounted in said frame and connected with said die, said annular member eccentrically surrounding and spaced from said die holder; and means for rotating said annular member and said die holder at the same rate of speed and in the same direction whereby the die is caused to reciprocate in said slot toward and away from said passage.

2. An apparatus for cold-reducing elongated stock, said apparatus comprising, in combination, a frame; a die holder rotatably received in said frame, said die holder formed with a passage for a workpiece and having at least one substantially radial slot communicating with said passage; a die reciprocably received in said slot; a bearing mounted in said frame and comprising a plurality of annularly arranged rolling elements, said bearing spacedly surrounding and eccentric with respect to said die holder; an annular member coaxially and rotatably mounted in said bearing, said annular member connected with said die and eccentrically surrounding said die holder in spaced relation; and means for rotating said annular member and said die holder at the same rate of speed and in the same direction whereby the die is caused to reciprocate in said slot toward and away from said passage.

3. In an apparatus for cold-reducing elongated metallic stock, in combination, rotary die holder means formed with an axial passage for a workpiece and having at least one radially extending open slot; a die reciprocably received in said slot and having a working face at its end closer to said passage; annular means spacedly surrounding said die holder means and connected with said die, said annular means eccentric with respect to said die holder means; and driving means connected with one of said first mentioned means for rotating said die holder means and said annular means in the same direction and at the same rate of speed whereby said die is caused to reciprocate in said slot toward and away from said passage.

4. In an apparatus for cold-reducing elongated metallic stock, in combination, rotary die holder means formed with an axial passage for a workpiece and having at least one radially extending open slot; a die reciprocably received in said slot and having a working face at its end closer to said passage; an anvil mounted in said die holder means adjacent to said passage and diametrically opposed to said die; annular means spacedly surrounding said die holder means and connected with said die, said annular means eccentric with respect to said die holder means; and driving means connected with one of said first mentioned means for rotating said die holder means and said annular means in the same direction and at the same rate of speed whereby said die is caused to reciprocate in said slot toward and away from said anvil.

5. In an apparatus for cold-reducing elongated metallic stock, in combination, rotary die holder means formed with an axial passage for a workpiece and having at least one radially extending open slot; a die reciprocably received in said slot and having a working face at its end closer to said passage; annular means spacedly surrounding said die holder means and connected with said die, said annular means eccentric with respect to said die holder means; and driving means connected with said die holder means for rotating the same with said die whereby the die transmits rotation to said annular means and is caused to reciprocate in said slot toward and away from said passage.

6. In an apparatus for cold-reducing elongated metallic stock, in combination, rotary die holder means formed with an axial passage for a workpiece and having at least one radially extending open slot; a die reciprocably received in said slot and having a working face at its end closer to said passage; an antifriction bearing spacedly surrounding and eccentric with respect to said die holder means, said antifriction bearing comprising a plurality of annularly arranged rolling elements; annular means spacedly surrounding said die holder means and coaxially received in said bearing so that said rolling elements are disposed thereabout, said annular means connected with said die; and driving means connected with one of said first mentioned means for rotating said die holder means and said annular means in the same direction and at the same rate of speed so that said die is caused to reciprocate toward and away from said passage.

7. In an apparatus of the character described, in combination, rotary die holder means; at least one die mounted in and reciprocable in the radial direction of said die holder means; and annular die supporting means eccentrically surrounding said die holder means and connected with said die so that said die couples said annular means for rotation with said die holder means.

8. In an apparatus of the character described, in combination, rotary die holder means formed with an axial passage for a workpiece and with at least one open radial slot communicating with said passage; a die reciprocably received in said slot; an anvil mounted in said die holder means adjacent to said passage at a point diametrically opposite from said slot; and annular die supporting means eccentrically surrounding said die holder means and connected with said die so that said die couples said annular means for rotation with said die holder means.

9. In an apparatus of the character described, in combination, rotary die holder means; at least one die mounted in and reciprocable in the radial direction of said die holder means; annular die supporting means eccentrically surrounding said die holder means; a connection between said die and said annular means; and an electric motor drivingly connected with one of said means so that said die drivingly connects one of said means with the other of said means and is caused to reciprocate in said slot when one of said means rotates.

References Cited in the file of this patent
UNITED STATES PATENTS 1,468,272    Berg ---------------- Sept. 18, 1923
2,460,490    Cook ---------------- Feb. 1, 1949